United States Patent
Kruiskamp

(10) Patent No.: US 10,063,081 B2
(45) Date of Patent: Aug. 28, 2018

(54) MAXIMUM POWER POINT TRACKING IN ENERGY HARVESTING DC-TO-DC CONVERTER

(71) Applicant: Dialog Semiconductor B.V., s-Hertogenbosch (NL)

(72) Inventor: Marinus Wilhelmus Kruiskamp, 's-Hertogenbosch (NL)

(*) Notice: Subject to any disclaimer, the term of this patent is extended or adjusted under 35 U.S.C. 154(b) by 91 days.

(21) Appl. No.: 14/989,926

(22) Filed: Jan. 7, 2016

(65) Prior Publication Data

US 2016/0197508 A1 Jul. 7, 2016

(30) Foreign Application Priority Data

Jan. 7, 2015 (DE) .................. 10 2015 200 060

(51) Int. Cl.
*H01H 47/00* (2006.01)
*H02J 7/00* (2006.01)
*H02M 3/156* (2006.01)
*H02M 3/04* (2006.01)

(52) U.S. Cl.
CPC ............. *H02J 7/0068* (2013.01); *H02M 3/04* (2013.01); *H02M 3/156* (2013.01)

(58) Field of Classification Search
USPC .......................................................... 307/130
See application file for complete search history.

(56) References Cited

U.S. PATENT DOCUMENTS

| | | | | |
|---|---|---|---|---|
| 9,680,323 B2* | 6/2017 | Ramorini | ............... | H02J 7/007 |
| 9,680,533 B2* | 6/2017 | Gudan | ............... | H04B 5/0062 |
| 9,747,538 B2* | 8/2017 | Gudan | ............... | G06K 19/0715 |
| 2007/0236187 A1* | 10/2007 | Wai | ............... | H02J 3/383 |
| | | | | 323/222 |
| 2013/0265140 A1* | 10/2013 | Gudan | ............... | G06K 7/10207 |
| | | | | 340/10.3 |
| 2014/0062672 A1* | 3/2014 | Gudan | ............... | G06K 19/0715 |
| | | | | 340/10.33 |
| 2015/0128733 A1* | 5/2015 | Taylor | ............... | H02J 17/00 |
| | | | | 73/865.8 |
| 2016/0079791 A1* | 3/2016 | Kim | ............... | H02J 7/345 |
| | | | | 320/166 |

(Continued)

OTHER PUBLICATIONS

"Platform Architecture for Solar, Thermal, and Vibration Energy Combining With MPPT and Single Inductor," by Saurav Bandyopadhyay et al., IEEE Journal of Solid-State Circuits, vol. 47, No. 9, Sep. 2012, pp. 2199-2215.

(Continued)

Primary Examiner — Adam Houston
(74) Attorney, Agent, or Firm — Saile Ackerman LLC; Stephen B. Ackerman

(57) ABSTRACT

An energy harvesting direct current to direct current 'DC-to-DC' converter circuit is presented. It is comprised of an energy storage element, an input configured to receive an input voltage, an output; switching means configured to perform cycles. Each cycle is marked when the input voltage reaches a reference voltage, switching the circuit such that the energy storage element enters into an energy charging state in which the energy storage element stores energy provided by the input voltage. Control means is configured to determine the reference voltage based on the number of cycles per time period performed by the circuit.

24 Claims, 5 Drawing Sheets

(56) References Cited

U.S. PATENT DOCUMENTS

| | | | |
|---|---|---|---|
| 2016/0099582 A1* | 4/2016 | Ramorini | H02J 7/0052 320/162 |
| 2016/0196455 A1* | 7/2016 | Gudan | H04B 5/0062 340/10.5 |
| 2016/0197508 A1* | 7/2016 | Kruiskamp | H02J 7/0068 307/130 |
| 2016/0254844 A1* | 9/2016 | Hull | H04B 5/0062 340/6.1 |
| 2017/0126013 A1* | 5/2017 | Vaidya | H02J 4/00 |
| 2017/0237466 A1* | 8/2017 | Carr | H04B 5/0031 455/41.1 |

OTHER PUBLICATIONS

"Overview of Maximum Power Point Tracking Technologies for Photovoltaic Power Systems," by Weidong Xiao et al., IECON 2011—37th Annual Conference on IEEE Industrial Electronics Society, Nov. 7-10, 2011, pp. 3900-3905.

"Maximum Power Point Algorithm in PV Generation: An Overview," by Hardik P. Desai et al., PEDS '07. 7th International Conference on Power Electronics and Drive Systems, 2007, Nov. 27-30, 2007, pp. 624-630.

"Boost Converter With Dynamic Input Impedance Matching for Energy Harvesting With Multi-Array Thermoelectric Generators," by Salvador Carreon-Bautista et al., IEEE Transactions on Industrial Electronics, vol. 61, No. 10, Oct. 2014, pp. 5345-5353.

"Ultra Low Power Boost Converter with Battery Management for Energy Harvester Applications," Slusahoa, Oct. 2011, Texas Instruments, www.ti.com, 25 pgs.

\* cited by examiner

MAXIMUM POWER POINT TRACKING IN ENERGY HARVESTING DC-TO-DC CONVERTER

TECHNICAL FIELD

The invention relates to an energy harvesting DC-to-DC converter circuit. The invention further relates to method of operating an energy harvesting DC-to-DC converter circuit.

BACKGROUND

Energy harvesting is the process by which energy is derived from external sources, captured, and stored for small, wireless autonomous devices, like those used in wearable electronics and wireless sensor networks. A direct current to direct current 'DC-to-DC' converter circuit is an electronic circuit which converts a source of direct current (DC) from one voltage level to another by first charging a energy storage element using an input voltage from the, energy harvester and then discharging the energy storage element in order to provide the energy at the output of the DC-to-DC converter. It is a class of power converter. DC-to-DC converters can be used to increase the amount of energy harvested from an energy source. The maximum power-point (MPP) is the input voltage of the DC-to-DC converter at which the maximum amount of power is harvested. Maximum Power-Point Tracking (MPPT) is an algorithm or procedure which makes sure that the harvester is operated at or close to the Maximum Power Point.

A known way of doing MPPT is called linear approximation, wherein the harvester output voltage is regulated at 50% (in case of Piezo or Thermal electrical Generator (TEG)) or at 70% . . . 80% (Photovoltaic) of the harvester output open-circuit voltage $V_{oc}$. It is known to sample or measure the harvester output open-circuit voltage $V_{oc}$ and multiply that voltage by a constant factor (0.5 for TEG or Piezo and 0.7 . . . 0.8 for Photovoltaic). The DC-to-DC converter attached to the harvester can be controlled in a way that the input voltage of the DC-to-DC-converter is regulated to that value. A drawback of this MPPT implementation is that it is necessary to sample the harvester output open-circuit voltage $V_{oc}$ on a regular basis (during that time the output power of the DC-to-DC converter is zero). This will lower the overall efficiency. Also a voltage dependent efficiency of the DC-to-DC converter itself is not taken into account; a voltage of 0.5×Voc is optimal for a TEG, but might not be the optimum for the combination of a TEG and a boost-converter. This is especially true for very low boost-converter input voltages, since the efficiency of boost-converters usually drops significantly at very low input voltages. Therefore, it is necessary to know the characteristics of the harvester (the MPP of the harvester relative to the harvester open-circuit voltage $V_{oc}$).

Another way of doing MPPT is through "Perturb and Observe", i.e., searching the peak of the power-curve by, for instance, making a small change (increase or decrease) to the input voltage $V_{in}$ of the DC-to-DC converter and measure the power at the output of the DC-to-DC converter. If the power increases compared to the power at the previous input voltage, then continue changing $V_{in}$ in the same direction (i.e., if Vin has been previously increased, then continue increasing $V_{in}$ and vice versa). If the power has decreased, change $V_{in}$ in the opposite direction (i.e., if Vin has been previously increased, then decrease $V_{in}$ and vice versa). A difficulty of "Perturb and Observe" is an accurate measurement of the input voltage and current. For large solar panels this overhead in terms of cost and energy may be relatively small, but for small wearables and wireless sensors, the additional cost may be significant.

Bandyopadhyay, S.; Chandrakasan, A., "Platform architecture for solar, thermal, and vibration energy combining with MPPT and single inductor," *IEEE Journal of solid-state circuits*, vol. 47, no. 9, September 2012, discloses a multi-input energy harvesting system using a time-based power monitor for achieving maximum power point tracking for the harvester wherein a boost-converter in fixed-frequency Discontinuous Conduction Mode (DCM) is used. The input impedance of this boost converter can be controlled by changing the amount of time $T_1$ that the energy storage element is storing energy. The time $T_2$ while the boost converter is discharging is a function of the power delivered by the harvester and the output voltage. The algorithm changes $T_1$ and optimizes for the maximum value of $T_2$. This approach has a drawback in that a DCM boost converter has its optimal efficiency for a limited range of peak-inductor-currents (for higher currents, resistive losses may become disproportionally large, whereas for lower currents the losses for closing/opening the switches may become disproportionally large). In the fixed-frequency approach, the peak-inductor current can vary over a very wide range. Therefore the boost-converter may often not have the optimal efficiency. Another limitation is that $T_2$ has to be measured with a fine resolution.

SUMMARY

It would be advantageous to implement a more efficient and/or cost-effective MPPT. An object of the invention is to implement MPPT in an efficient and cost-effective way. In a first aspect, the invention provides an energy harvesting direct current to direct current 'DC-to-DC' converter circuit comprising an energy storage element;
an input configured to receive an input voltage;
an output;
switching means configured to perform cycles wherein each cycle comprises, when the input voltage reaches a reference voltage, switching the circuit such that the energy storage element enters into an energy charging state in which the energy storage element stores energy provided by the input voltage;
and control means configured to determine the reference voltage based on the number of cycles per time period performed by the circuit.

This way, the energy harvesting DC-to-DC converter circuit is relatively efficient and/or cost-effective. The number of cycles may provide relevant information about the energy retrieved from the harvester, and may be relatively easy to measure. Using this information, a suitable reference voltage may be determined. The DC-to-DC-converter may be controlled such that its input voltage tracks a reference voltage, wherein the reference voltage may be determined to find the maximum output power and wherein the output power is estimated by counting the number of cycles per time period performed by the circuit while operating the energy storage element such that it stores an amount of energy determined by the upper energy threshold. This upper energy threshold can be calculated, for example, such that the DCDC-converter has optimum efficiency, as high upper energy thresholds would cause resistive losses to become disproportionally large and low upper energy thresholds would cause switching losses disproportionally large.

The cycle may further comprise, when an energy stored in the energy storage element reaches an upper energy threshold, switching the circuit such that the energy storage element enters into an energy discharging state in which the energy storage element provides energy to the output.

The cycle may further comprise, when the energy stored in the energy storage element reaches a lower energy threshold, switching the circuit such that the energy storage element enters into a waiting state in which the energy storage element is not charging neither discharging energy. This way, the energy stored in the energy storage element except a lower energy threshold may be transferred to the output. This waiting state enables the input voltage to increase further after the energy storage element has been discharged.

The reference voltage is varied in order to track the maximum number of cycles per time period performed by the circuit. This way, the maximum output power may be found and harvested from the circuit by varying the reference voltage.

The energy storage element may comprise an inductor. This way, when a current flows through the inductor, energy can be efficiently stored temporarily in the inductor. The upper energy threshold may be an upper threshold on a current through the inductor. Similarly, the lower energy threshold may be a lower threshold on the current through the inductor.

The energy harvesting 'DC-to-DC' converter circuit may operate in a discontinuous conduction mode 'DCM'. This way, the energy stored in the energy storage element may be transferred to the output.

The energy storage element may comprise a first end connected to the input and a second end, and wherein the switching means comprise a first switch comprising a first end connected to the second end of the energy storage element and a second end connected to ground and wherein the first switch is configured to connect the energy storage element to the ground when the input voltage reaches a reference voltage such that the energy storage element enters into a charging state and to disconnect the energy storage element from the ground when the energy stored in the energy storage element reaches an upper energy threshold. This is an efficient way of implementing the DCDC converter.

The switching means may further comprise a second switch having a first end connected to the second end of the energy storage element and having a first end connected to the output and wherein the second switch is configured to connect the energy storage element to the output when the energy stored in the energy storage element reaches an upper energy threshold such that the energy storage element enters into a discharging state.

The energy storage element may comprise a first end and a second end wherein the second end is connected to the output, and wherein the switching means comprise a third switch having a first end connected to the first end of the energy storage element and having a second end connected to the input and wherein the third switch is configured to connect the energy storage element to the input when the input voltage reaches a reference voltage such that the energy storage element enters into a charging state and to disconnect the energy storage element from the input when the energy stored in the energy storage element reaches an upper energy threshold.

The switching means may further comprise a fourth switch having a first end connected to the first end of the energy storage element and having a second end connected to the ground and wherein the fourth switch is configured to connect the energy storage element such that the energy storage element enters into a discharging state when the energy stored in the energy storage element reaches an upper energy threshold.

The control means may further comprise a first comparison means configured to compare the input voltage to the reference voltage. This is an efficient way of implementing the control means.

The control means may further comprise a second comparison means configured to compare the energy stored in the energy storage element to an upper energy threshold.

The control means may comprise a third comparison means configured to compare the energy stored in the energy storage element to a lower energy threshold.

In another aspect, the invention provides a method to operate an energy harvesting direct current to direct current 'DC-to-DC' converter circuit comprising the steps of:

operating the circuit in order to perform cycles wherein each cycle comprises, when the input voltage reaches a reference voltage, switching the circuit such that the energy storage element enters into an energy charging state in which the energy storage element stores energy provided by the input voltage;

determining the reference voltage based on the number of cycles per time period performed by the circuit.

The person skilled in the art will understand that the features described above may be combined in any way deemed useful. Moreover, modifications and variations described in respect of the system may likewise be applied to a method.

BRIEF DESCRIPTION OF THE DRAWINGS

In the following, aspects of the invention will be elucidated by means of examples, with reference to the drawings. The drawings are diagrammatic and are not drawn to scale.

DESCRIPTION

Figure 1:
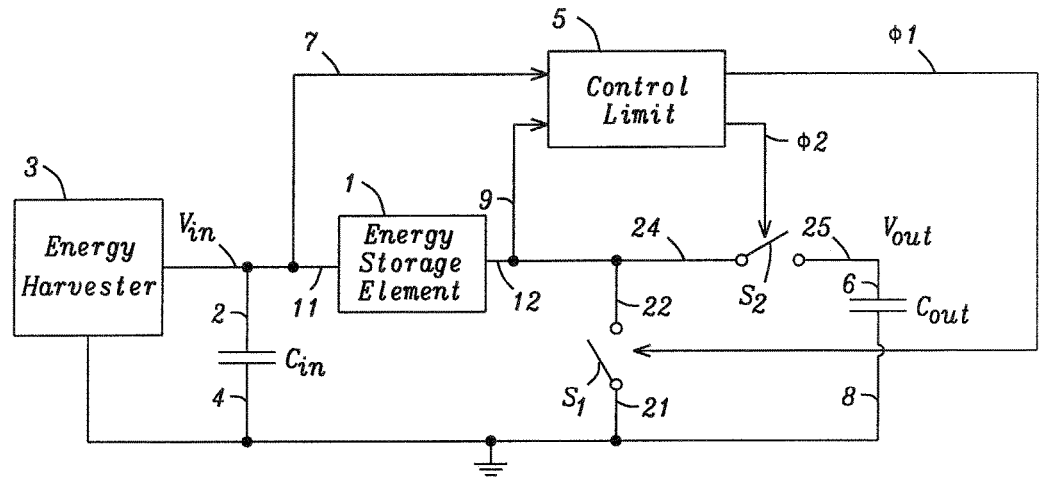
FIG. 1 shows a diagram of an energy harvesting circuit using a boost converter circuit.

FIG. 1 illustrates a harvesting system using a boost converter circuit. The harvesting system of FIG. 1 contains a harvester 3, an energy storage element 1, and switches $S_1$ and $S_2$. The harvester 3 is connected to a boost converter circuit providing an input voltage $V_{in}$ to the boost converter circuit and the boost converter circuit provides an output voltage $V_{out}$ based on the input voltage $V_{in}$, wherein typically $V_{in} < V_{out}$. In the example of FIG. 1, a capacitor $C_{in}$ comprising a first end 2 and a second end 4 is connected in parallel to the harvester 3. The first end 2 of the capacitor $C_{in}$ is connected to the input voltage $V_{in}$ and the second end 4 of the capacitor $C_{in}$ is connected to ground. The capacitor $C_{in}$ may be used to couple the harvester to the boost converter circuit. The energy storage element 1 comprises a first end 11 and a second end 12. The first end 11 of the energy storage element 1 is connected to the input voltage $V_{in}$. The storage energy element 1 may be any device suitable for storing energy, for instance, an inductor, or a capacitor, or a combination of any number of inductors and/or capacitors.

The switch $S_1$ comprises a first end 21 and a second end 22. The first end 21 of the switch $S_1$ is connected to ground and the second end 22 of the switch S is connected to the second end 12 of the energy storage element 1. The switch $S_2$ comprises a first end 24 and a second end 25. The first end 24 of the switch $S_2$ is connected to the second end 12 of the energy storage element 1 and the second end 25 of the switch $S_2$ is connected to the output $V_{out}$. The switches $S_1$ and $S_2$ may be implemented with any kind of suitable switching device, for example, a transistor, a diode, etc.

As illustrated in FIG. 1, the boost converter circuit may comprise a capacitor $C_{out}$ having a first end 6 and a second end 8 wherein the first end 6 of the capacitor $C_{out}$ is connected to the output $V_{out}$ of the boost circuit and the second end 8 of the capacitor $C_{out}$ is connected to ground. The harvesting system of FIG. 1 comprises also a control unit 5 wherein the control unit 5 comprises a first input 7 and a second input 9. The first input 7 is connected to the input voltage $V_{in}$ and the second input 9 of the control unit 5 is configured to receive a measure of the amount of energy stored in the energy storage element 1. This measurement may be performed by any suitable means or method, for instance, if the energy storage element 1 comprises an inductor, the energy stored in the inductor may be measured by measuring the voltage over the closed switch (which is S1 during the charging state and S2 during the discharging state), and use the on-resistance of the closed switch to relate the switch-voltage to inductor. The control unit 5 is also configured to generate a first control signal $\varphi_1$ and/or a second control signal $\varphi_2$ in order to control the switching of $S_1$ and $S_2$ based on the first input 7 and/or the second input 9.

Figure 2:
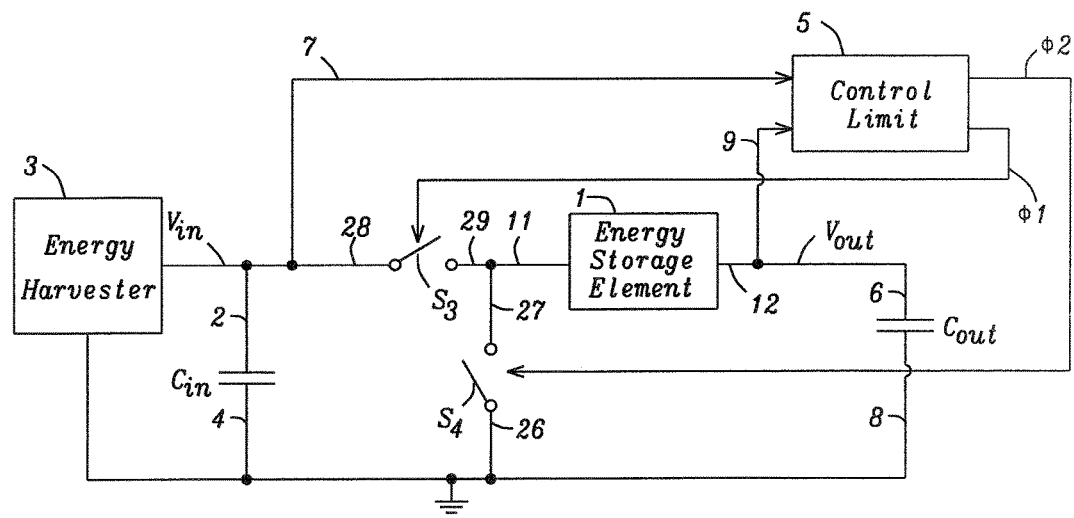
FIG. 2 shows a diagram of an energy harvesting circuit using a buck converter circuit.

FIG. 2 illustrates a harvesting system using a buck converter circuit according to another embodiment of this invention. In FIG. 2, the same reference numbers that have been used in FIG. 1 have been used to indicate elements that are similar in structure and function and these common elements will not be described again. The harvester 3 is connected to the buck converter circuit providing the input voltage $V_{in}$ to the buck converter circuit and the buck converter circuit provides the output voltage $V_{on}$ based on the input voltage $V_{in}$, wherein typically $V_{in} > V_{out}$. The buck converter circuit of FIG. 2 comprises a switch $S_3$ and a switch $S_4$. The switch $S_3$ has a first end 28 and a second end 29. The first end 28 is connected to the voltage input $V_{in}$ and the second end 29 is connected to the first end 11 of the energy storage element 1. The switch $S_4$ has a first end 27 and a second end 26. The first end 27 is connected to the first end 11 of the energy storage element 1 and the second end 26 is connected to ground. The control unit 5 is also configured to generate the first control signal $\varphi_1$ and/or the second control signal $\varphi_2$ in order to control the switching of $S_3$ and/or $S_4$ based on the first input 7 and/or the second input 9.

Figure 3:
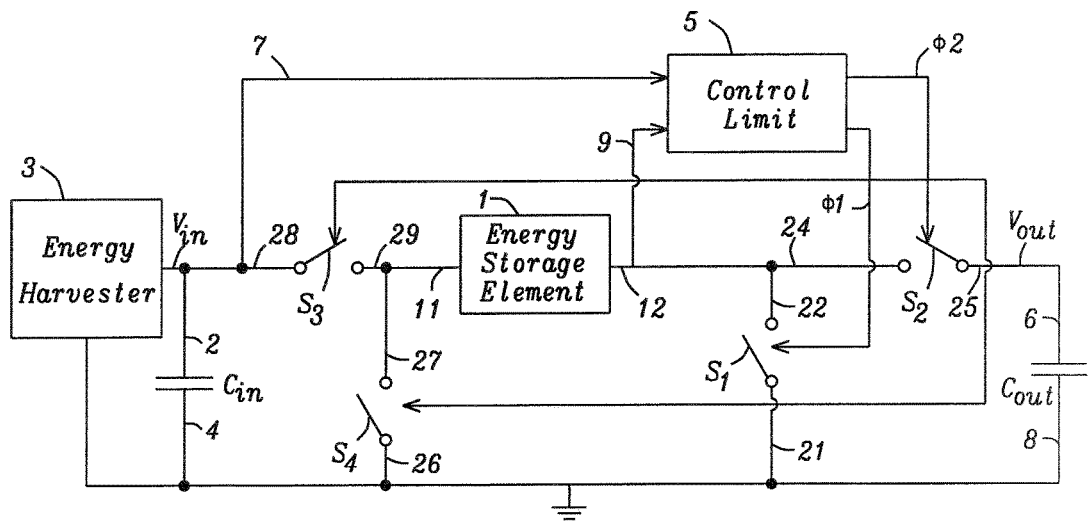
FIG. 3 shows a diagram of an energy harvesting circuit using a buck-boost converter circuit.

FIG. 3 illustrates a harvesting system using a buck-boost converter circuit according to a third embodiment of this invention. The harvesting system of FIG. 3 comprises switches $S_1$, $S_2$, $S_3$, and $S_4$, wherein the switches $S_1$ and $S_2$ of FIG. 3 are connected in the same way as the switches $S_1$ and $S_2$ of FIG. 1, and the switches $S_3$ and $S_4$ of FIG. 3 are connected in the same way as the switches $S_3$ and $S_4$ of FIG. 2. In FIG. 3, the same reference numbers that have been used in FIG. 1 and FIG. 2 have been used for elements that are similar in structure and function and these common elements will not be described again. The harvester 3 is connected to the buck boost converter circuit providing the input voltage $V_{in}$ to the buck boost converter circuit and the buck boost converter circuit provides the output voltage $V_{out}$ based on the input voltage $V_{in}$, wherein typically $V_{in} > V_{out}$ or $V_{in} < V_{out}$. The control unit 5 is also configured to generate the first control signal $\varphi_1$ and/or the second control signal $\varphi_2$ in order to control the switching of $S_1$ and/or $S_2$ and/or $S_3$ and/or $S_4$ based on the first input 7 and/or the second input 9. Although in FIG. 3, the switches S1 and S3 are controlled by the same signal $\varphi_1$ and the switches S2 and S4 are controlled by the same signal $\varphi_2$, other control signals may be generated by the control unit 5 and other suitable combinations of control signals may control the switches $S_1$, $S_2$, $S_3$, and $S_4$. For instance, each switch may be controlled by its own signal, i.e., the control unit 5 may be configured to generate the first control signal $\varphi_1$ and/or the second control signal $\varphi_2$ and/or a third control signal $\varphi_3$ and/or a fourth control signal $\varphi_4$ in order to control the switching of $S_3$ and/or $S_4$ based on the first input 7 and/or the second input 9.

The operation of the harvesting system using a boost convertor circuit of FIG. 1 will be now explained with reference to FIGS. 1, 4, 5, and 6.

Figure 4:
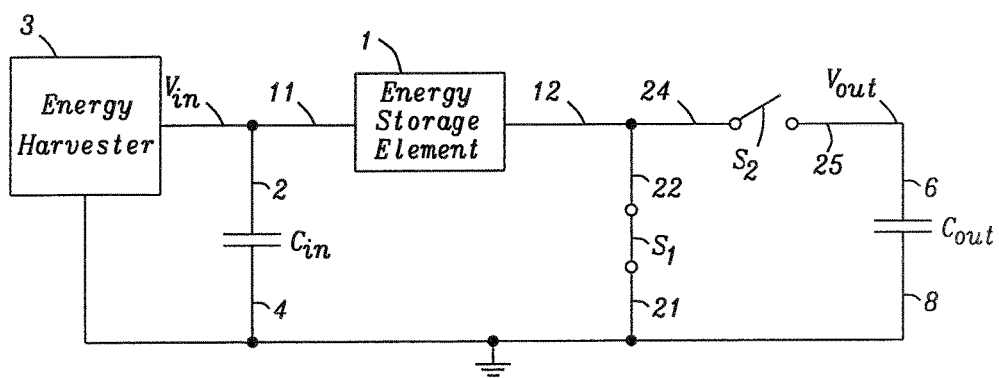
FIG. 4 shows a diagram of the energy harvesting circuit of FIG. 1 during operation.
Figure 5:
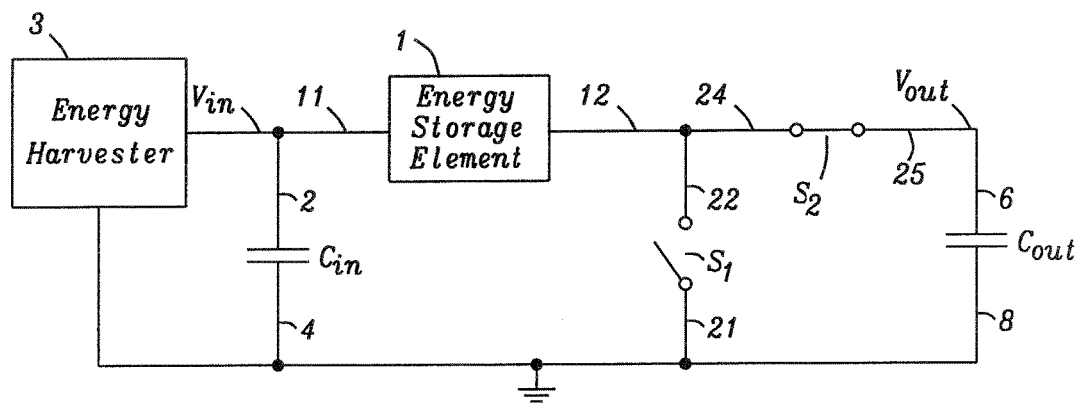
FIG. 5 shows a diagram of the energy harvesting circuit of FIG. 1 during operation.
Figure 6:
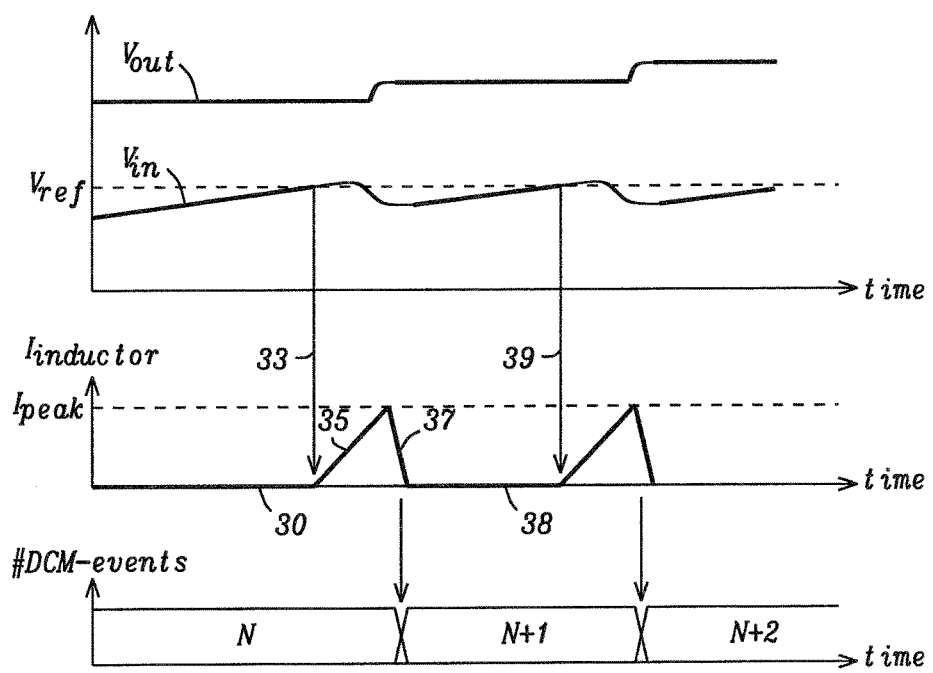
FIG. 6 shows a diagram of time waveforms of several signals of the energy harvesting circuit of FIG. 1 during operation.

FIGS. 1, 4 and 5 show an energy harvesting system in different states during operation. FIG. 1 shows a diagram of the energy harvesting circuit in a waiting state in which the energy storage element is not charging nor discharging energy, FIG. 4 shows a diagram of the energy harvesting circuit in a charging state in which the energy storage element is charging energy, and FIG. 5 shows a diagram of the energy harvesting circuit in a discharging state in which the energy storage element is discharging energy. FIG. 6 shows example waveforms of several signals as a function of time for the different states illustrated in FIGS. 1, 4, and 5. Although the following example will consider that the energy storage element is an inductor and the current through the inductor 1 $I_{inductor}$ represented in FIG. 6 is used as a measurement of the amount of energy stored in the inductor 1. Other kinds of energy storage elements may be used. For instance a capacitor may be used as an energy storage element. Other quantities may be used as a measurement of the amount of energy stored in the energy storage element 1. For example, energy is stored with the voltage of a capacitor. Also any other DCDC circuit configurations may be possible.

FIG. 6 illustrates the values of $V_{in}$, $V_{out}$, and $I_{inductor}$ as a function of time for the different states illustrated in FIGS. 1, 4, and 5. The $I_{inductor}$ is the current through the inductor 1. As it can be seen in FIGS. 1 and 6, during the time interval 30 the input voltage $V_{in}$ is lower than a reference voltage $V_{ref}$ and both switches $S_1$ and $S_2$ are open. Therefore, the energy harvesting circuit is in a waiting state in which no current circulates through the inductor 1. When the $V_{in}$ reaches a reference voltage $V_{ref}$, at time 33, the control unit 5 sends a control signal $\varphi_1$ to close the switch $S_1$ in order to connect the second end 12 of the inductor element 1 to the ground as it can be seen in FIG. 4. When the inductor 1 is connected to ground, the energy harvesting circuit enters into a charging state in which current flows through the inductor and the inductor 1 stores some energy by generating a magnetic field. The current $I_{inductor}$ in the inductor 1 increases during the time interval 35 as it can be seen in FIG. 6. When the current $I_{inductor}$ through the inductor element 1 reaches an upper energy threshold that in FIG. 6 is indicated by $I_{peak}$, the control unit 5 sends a control signal $\varphi_1$ to open the switch $S_1$ in order to disconnect the second end 12 of the inductor element 1 from the ground and the control unit 5 sends a control signal $\varphi_2$ to close the switch $S_2$ in order to connect the second end 12 of the inductor element 1 to the output $V_{out}$ as it can be seen in FIG. 5. When the inductor 1 is connected to the output $V_{out}$, the energy harvesting circuit enters into a discharging state in which, during the time interval 37, the energy previously accumulated in the inductor 1 is transferred to the output $V_{out}$ therefore charging the capacitor $C_{out}$ and the current $I_{inductor}$ in the inductor 1 starts decreasing, as it can be seen in FIG. 6. Time intervals 30, 35 and 37 a DCM event wherein a completed switching cycle has been performed by the circuit. A new DCM event starts with time interval 38, switching again at time 39 when the $V_{in}$ reaches $V_{ref}$. Although in FIG. 6 the circuit performs only one DCM event each time $V_{in}$ reaches $V_{ref}$, the circuit may perform any number of DCM cycles whenever Vin is above Vref.

Although the above example has considered that the DCDC circuit worked in a DCM mode, the circuit may be working in a continuous mode wherein the current at the inductor 1 does not discharge to zero after each charging period, but it does discharge to a lower energy threshold.

Figure 7:
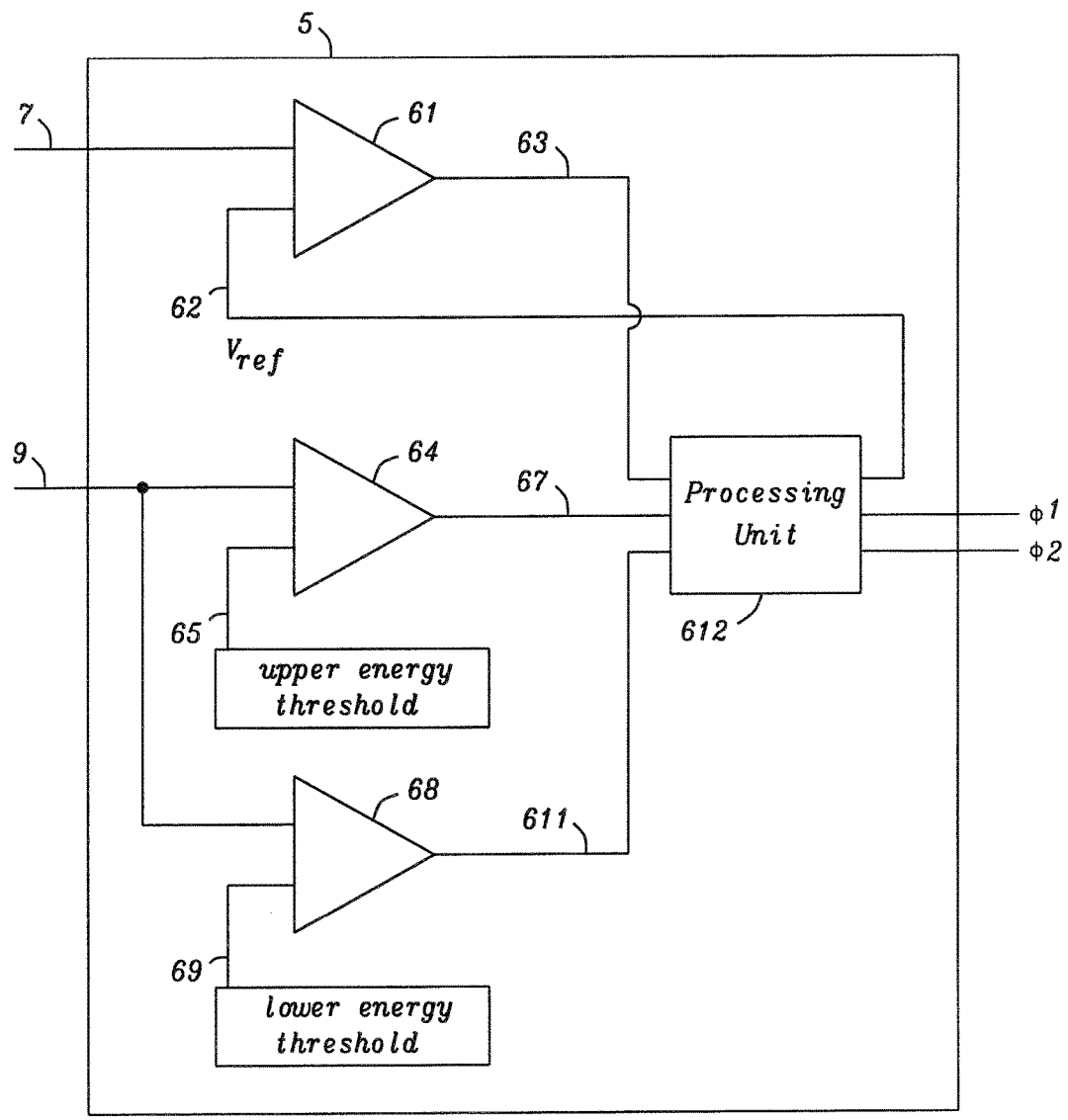
FIG. 7 shows diagram of a control unit for an energy harvesting circuit.

FIG. 7 shows an example of the control unit 5 of FIGS. 1, 2 and 3 in which the same reference numbers refer to the same components as in FIGS. 1, 2 and 3. Although the following example will consider that the control unit is implemented as one device, the control unit may be implemented in the form of separate devices placed in several suitable parts of the DCDC circuit. The control unit 5 of FIG. 7 comprises a first comparator unit 61, a second comparator unit 64 and a third comparator unit 68. The first comparator unit 61 is configured to receive the first input 7, to receive $V_{ref}$ at an input line 62, to compare the first input 7 to the $V_{ref}$ and based on the result of the comparison, to output a first comparison result 63. The second comparator unit 64 is configured to receive the second input 9, to receive an upper energy threshold at an input line 65, to compare the second input 9 to the upper energy threshold and based on the result of the comparison, to output a second comparison result 67. The third comparator unit 69 is configured to receive the second input 9, to receive a lower energy threshold at an input line 69, to compare the second input 9 to the lower energy threshold and based on the result of the comparison, to output a third comparison result 611. The control unit 5 of FIG. 7 also comprises a processing unit 612 configured to receive the first comparison result 63, to receive the second comparison result 67, to receive the third comparison result 611 and based on the first comparison result 63, the second comparison result 67, and the third comparison result 611, to generate the first control signal $\varphi_1$ and the second control signal $\varphi_2$.

Figure 8:
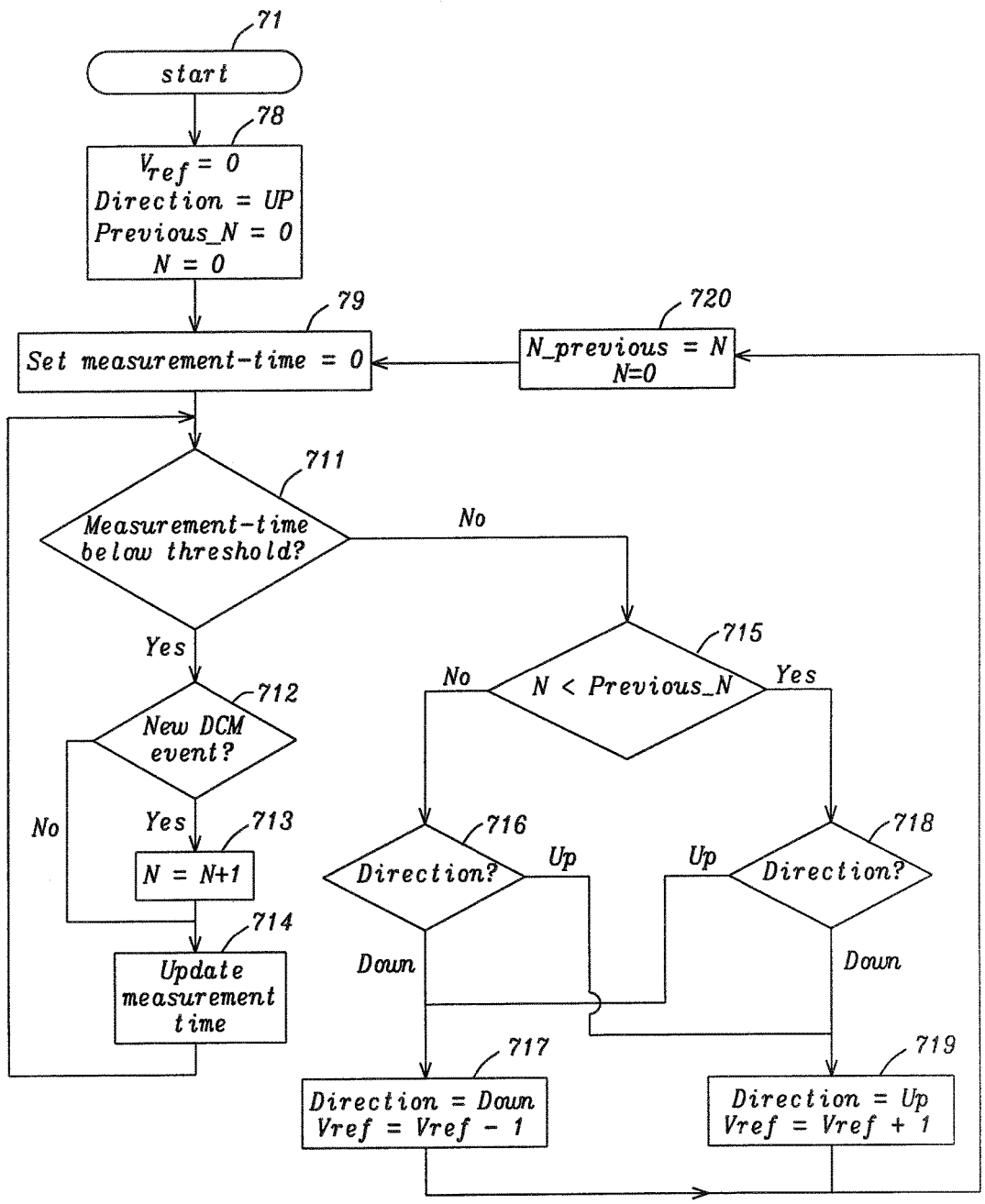
FIG. 8 shows a flow diagram illustrating an energy harvesting method.

FIG. 8 shows a flow diagram illustrating an energy harvesting method of a MPPT algorithm searching for the reference voltage $V_{ref}$ that gives the maximum number of DCM events in a fixed time. This is only an example, and many different search algorithms are possible. The algorithm searches for the maximum number of DCM events that occur in a predetermined time period as a function of the reference voltage $V_{ref}$. In FIG. 8, $V_{ref}$ indicates the reference voltage. Direction indicates in which direction $V_{ref}$ is modified: if Direction is "UP", it indicates that the value of $V_{ref}$ is or has been increased and if Direction equals "Down", it indicates that the value of $V_{ref}$ is or has been decreased. N and Previous_N indicate the number of cycles performed by the circuit during a time period of size "threshold" and measurement-time is a variable going from zero to "threshold". In step 71 and 78 of FIG. 8, the harvesting system is started. $V_{ref}$ is set up to zero, Direction is set up to "UP" and Previous_N and N are set up to zero in step 78 of FIG. 8. $V_{ref}$ and Direction may be set up to any suitable value. In step 79 of FIG. 8, measurement-time is set to zero in order to start a time period. Step 711 checks if measurement-time is below a threshold value. Threshold may have any suitable value and may be set up in any suitable way. If measurement-time is below threshold, then the time period in which the number of cycles performed by the circuit is measured is still not over, therefore step 712 checks if a new DCM event has occurred, updating N in step 713 if that is the case. Although in the method illustrated by FIG. 8 it is considered that the circuit is performing a DCM event and DCM events are used in order to update the number of cycles performed by the circuit N, the circuit may be performing any other kind of switching event causing the energy storage element to change from a charging/discharging state to a discharging/charging state and that switching event may be used in order to update the number of cycles performed by the circuit N instead of DCM events. In step 714 the measurement-time is updated and the method goes back to step 711 where the measurement-time is compared to the threshold value in order to decide if the time period in which the number of cycles performed by the circuit is measured is over. In case the measurement-time is not below "threshold", it means the time period is over and the method goes to step 715, wherein N, which indicates the number of cycles performed by the circuit in this time period, is compared to Previous_N, which indicates the number of cycles performed by the circuit in the previous time period. If in step 715 N is equal or bigger than the Previous_N indicating that the number of cycles performed by the circuit in this time period is not less than the number of cycles performed by the circuit in the previous time period, it indicates that the power increases compared to the power at the previous $V_{ref}$ and then the algorithm should continue changing $V_{ref}$ in the same direction. Therefore, the algorithm goes to step 716 wherein if Direction was "Down", the algorithm goes to step 717 wherein Direction stays as "Down" and $V_{ref}$ is decreased, and if in step 716 Direction was "Up", the algorithm goes to step 719 wherein Direction stays as "Up" and $V_{ref}$ is increased.

If in step 715, N is lower than the Previous_N indicating that the number of cycles performed by the circuit in this time period is less than the number of cycles performed by the circuit in the previous time period, it indicates that the power decreases compared to the power at the previous $V_{ref}$ and then the algorithm should change $V_{ref}$ in the opposite direction. Therefore, the algorithm goes to step 718 wherein if Direction was "Up", the algorithm goes to step 717 wherein Direction changes to "Down" and $V_{ref}$ is decreased, and if in step 718 Direction was "Down", the algorithm goes to step 719 wherein Direction changes to "Up" and $V_{ref}$ is increased.

After both steps 717 and 719, the algorithm proceeds to step 720 wherein N_previous is updated to the value of N and N is set up to zero in order to measure the number of cycles of a new time period. In step 79 the measurement-time is set up gain to zero and a new measurement period can start.

In this way, this search algorithm will find the optimum $V_{ref}$ that maximizes the number of cycles performed by the circuit and therefore the amount of power at the output of the circuit.

The examples and embodiments described herein serve to illustrate rather than limit the invention. The person skilled in the art will be able to design alternative embodiments without departing from the scope of the claims. Reference signs placed in parentheses in the claims shall not be interpreted to limit the scope of the claims. Items described as separate entities in the claims or the description may be implemented as a single hardware or software item combining the features of the items described.

What is claimed is:

1. An energy harvesting direct current to direct current 'DC-to-DC' converter circuit comprising
    an energy storage element;
    an input configured to receive an input voltage;
    an output;
    switching means configured to perform cycles wherein each cycle comprises, when the input voltage reaches a reference voltage, switching the circuit such that the energy storage element enters into an energy charging state in which the energy storage element stores energy provided by the input voltage;
    and control means configured to determine the reference voltage based on a number of cycles per time period performed by the circuit, wherein the energy harvesting 'DC-to-DC' converter circuit operate is configured to operate in a discontinuous conduction mode 'DCM'.

2. The energy harvesting DC-to-DC converter circuit of claim 1 wherein the cycle further comprises, when an energy stored in the energy storage element reaches an upper energy threshold, switching the circuit such that the energy storage element enters into an energy discharging state in which the energy storage element provides energy to the output.

3. The energy harvesting DC-to-DC converter circuit of claim 1 wherein the cycle further comprises, when the energy stored in the energy storage element reaches a lower energy threshold, switching the circuit such that the energy storage element enters into a waiting state in which the energy storage element is not charging neither discharging energy.

4. The energy harvesting 'DC-to-DC' converter circuit of claim 1, wherein the control means is configured to vary the reference voltage in order to obtain a maximum number of cycles per time period performed by the circuit.

5. The energy harvesting 'DC-to-DC' converter circuit of claim 1, wherein the energy storage element comprises an inductor.

6. The energy harvesting 'DC-to-DC' converter circuit of claim 2, wherein the energy storage element comprises a first end connected to the input and a second end, and wherein the switching means comprise a first switch comprising a first end connected to the second end of the energy storage element and a second end connected to ground and wherein the first switch is configured to connect the energy storage element to the ground when the input voltage reaches the reference voltage such that the energy storage element enters into a charging state and to disconnect the energy storage element from the ground when the energy stored in the energy storage element reaches the upper energy threshold.

7. The energy harvesting 'DC-to-DC' converter circuit of claim 6, wherein the switching means further comprises a second switch having a first end connected to the second end of the energy storage element and having a first end connected to the output and wherein the second switch is configured to connect the energy storage element to the output when the energy stored in the energy storage element reaches the upper energy threshold such that the energy storage element enters into a discharging state.

8. The energy harvesting 'DC-to-DC' converter circuit of claim 2, wherein the energy storage element comprises a first end and a second end wherein the second end is connected to the output, and wherein the switching means comprise a third switch having a first end connected to the first end of the energy storage element and having a second end connected to the input and wherein the third switch is configured to connect the energy storage element to the input when the input voltage reaches the reference voltage such that the energy storage element enters into the charging state and to disconnect the energy storage element from the input when the energy stored in the energy storage element reaches the upper energy threshold.

9. The energy harvesting 'DC-to-DC' converter circuit of claim 8, wherein the switching means further comprises a fourth switch having a first end connected to the first end of the energy storage element and having a second end connected to the ground and wherein the fourth switch is configured to connect the energy storage element such that the energy storage element enters into a discharging state when the energy stored in the energy storage element reaches the upper energy threshold.

10. The energy harvesting 'DC-to-DC' converter circuit of claim 1, wherein the control means further comprises a first comparator configured to compare the input voltage to the reference voltage.

11. The energy harvesting 'DC-to-DC' converter circuit of claim 2, wherein the control means further comprises a second comparator configured to compare the energy stored in the energy storage element to the upper energy threshold.

12. The energy harvesting 'DC-to-DC' converter circuit of claim 3, wherein the control means comprises a third comparator configured to compare the energy stored in the energy storage element to the lower energy threshold.

13. A method of operating an energy harvesting direct current to direct current 'DC-to-DC' converter circuit, the method comprising the steps of:
    operating the circuit in order to perform cycles wherein each cycle comprises:
    when the input voltage reaches a reference voltage, switching the circuit such that the energy storage element enters into an energy charging state in which the energy storage element stores energy provided by the input voltage;
    determining the reference voltage based on a number of cycles per time period performed by the circuit, wherein the energy harvesting 'DC-to-DC' converter circuit operates in a discontinuous conduction mode 'DCM'.

14. The method of claim 13, wherein the cycle further comprises, when an energy stored in the energy storage element reaches an upper energy threshold, switching the circuit such that the energy storage element enters into an energy discharging state in which the energy storage element provides energy to the output.

15. The method of claim 14, wherein the cycle further comprises, when the energy stored in the energy storage element reaches a lower energy threshold, switching the circuit such that the energy storage element enters into a waiting state in which the energy storage element is not charging neither discharging energy.

16. The method of claim 13, wherein the control means varies the reference voltage in order to obtain a maximum number of cycles per time period performed by the circuit.

17. The method of claim 13, wherein the energy storage element comprises an inductor.

18. The method of claim 14, wherein the energy storage element comprises a first end connected to the input and a second end, and wherein the switching means comprise a first switch comprising a first end connected to the second end of the energy storage element and a second end connected to ground and wherein the first switch connects the energy storage element to the ground when the input voltage reaches the reference voltage such that the energy storage element enters into a charging state and to disconnect the energy storage element from the ground when the energy stored in the energy storage element reaches the upper energy threshold.

19. The method of claim 18, wherein the switching means further comprises a second switch having a first end connected to the second end of the energy storage element and having a first end connected to the output and wherein the second switch connects the energy storage element to the output when the energy stored in the energy storage element reaches the upper energy threshold such that the energy storage element enters into a discharging state.

20. The method of claim 14, wherein the energy storage element comprises a first end and a second end wherein the second end is connected to the output, and wherein the switching means comprise a third switch having a first end connected to the first end of the energy storage element and having a second end connected to the input and wherein the third switch connects the energy storage element to the input when the input voltage reaches the reference voltage such that the energy storage element enters into the charging state and to disconnect the energy storage element from the input when the energy stored in the energy storage element reaches the upper energy threshold.

21. The method of claim 20, wherein the switching means further comprises a fourth switch having a first end connected to the first end of the energy storage element and having a second end connected to the ground and wherein the fourth switch connects the energy storage element such that the energy storage element enters into a discharging state when the energy stored in the energy storage element reaches the upper energy threshold.

22. The method of claim 13, wherein the control means further comprises a first comparator to compare the input voltage to the reference voltage.

23. The method of claim 14, wherein the control means further comprises a second comparator to compare the energy stored in the energy storage element to the upper energy threshold.

24. The method of claim 15, wherein the control means comprises a third comparator to compare the energy stored in the energy storage element to the lower energy threshold.

\* \* \* \* \*